(12) United States Patent
Li (10) Patent No.: US 9,676,442 B1
(45) Date of Patent: Jun. 13, 2017

(54) MOPED

(71) Applicant: William Wei Li, Norwalk, CA (US)

(72) Inventor: William Wei Li, Norwalk, CA (US)

( * ) Notice: Subject to any disclaimer, the term of this patent is extended or adjusted under 35 U.S.C. 154(b) by 0 days.

(21) Appl. No.: 15/290,693

(22) Filed: Oct. 11, 2016

(51) Int. Cl.
*B62M 6/30* (2010.01)
*B62K 11/04* (2006.01)
*B62M 7/02* (2006.01)
*B62M 3/08* (2006.01)
*B62M 9/02* (2006.01)
*B62J 1/02* (2006.01)
*B62J 35/00* (2006.01)

(52) U.S. Cl.
CPC .............. *B62M 6/30* (2013.01); *B62K 11/04* (2013.01); *B62M 3/08* (2013.01); *B62M 7/02* (2013.01); *B62M 9/02* (2013.01); *B62J 1/02* (2013.01); *B62J 35/00* (2013.01)

(58) Field of Classification Search
CPC ........... B62K 11/04; B62M 9/02; B62M 7/02; B62M 1/26; B62M 6/55; B62M 1/12; B62M 1/28; B62M 1/24; B62M 3/08
See application file for complete search history.

(56) References Cited

U.S. PATENT DOCUMENTS

| | | | | |
|---|---|---|---|---|
| 4,267,898 A * | 5/1981 | Wheaton | ................... | B62M 7/08 180/205.5 |
| 4,637,274 A * | 1/1987 | Goldenfeld | .............. | B62M 6/45 180/206.4 |
| 4,650,024 A * | 3/1987 | Matsuda | ............... | B62K 25/005 280/219 |
| 5,280,936 A * | 1/1994 | Schmidlin | ................ | B62M 1/12 280/234 |
| 5,324,057 A * | 6/1994 | Chartrand | .............. | B62M 23/00 280/230 |
| 6,092,820 A * | 7/2000 | Evans | ....................... | B62K 7/00 224/422 |
| 6,182,991 B1 * | 2/2001 | Christini | ................ | B62K 25/08 280/230 |
| 7,040,441 B1 * | 5/2006 | Karaba | .................... | B62M 6/20 180/205.6 |
| 7,261,175 B1 * | 8/2007 | Fahrner | .................... | B62M 6/55 180/206.4 |
| 7,314,109 B2 * | 1/2008 | Holland | ................... | B62M 6/60 180/206.7 |
| 7,753,157 B1 * | 7/2010 | Woods | ................... | B62K 11/06 180/205.5 |

(Continued)

*Primary Examiner* — Anne Marie Boehler
*Assistant Examiner* — Gabriela A Craciun
(74) *Attorney, Agent, or Firm* — Clement Cheng (57) ABSTRACT

A moped has a frame with a steering socket connected to a front end. The front end has a front wheel. The front end steers the moped. An engine is mounted to the frame. The engine drives an engine transmission having an engine sprocket axle. The engine sprocket axle drives the engine sprocket. The engine sprocket drives the engine sprocket chain. A foot pedal is mounted on a foot pedal crank arm. The foot pedal crank arm is mounted to a foot pedal axle. The foot pedal axle is mounted to a foot pedal sprocket so that the foot pedal crank arm, the foot pedal axle and the foot pedal sprocket rotate together to drive a pedal chain. The engine is mounted at a height above the foot pedal sprocket. The engine sprocket axle drives the engine sprocket. The engine sprocket drives the engine sprocket chain.

11 Claims, 8 Drawing Sheets

(56) References Cited

U.S. PATENT DOCUMENTS

| | | | | |
|---|---|---|---|---|
| 8,042,641 | B2* | 10/2011 | Lawson | B62K 25/005 |
| | | | | 180/219 |
| 9,580,137 | B2* | 2/2017 | Felker | B62M 1/12 |
| 2005/0173176 | A1* | 8/2005 | Christini | B62K 25/08 |
| | | | | 180/224 |
| 2008/0035403 | A1* | 2/2008 | Hamilton | B62M 7/02 |
| | | | | 180/224 |
| 2009/0188738 | A1* | 7/2009 | Christini | B62M 23/00 |
| | | | | 180/224 |
| 2010/0212985 | A1* | 8/2010 | Clausen | B62M 7/02 |
| | | | | 180/206.5 |
| 2011/0120794 | A1* | 5/2011 | Hobel | B62M 11/06 |
| | | | | 180/206.4 |
| 2014/0026844 | A1* | 1/2014 | Yamashiro | F02B 77/00 |
| | | | | 123/198 R |
| 2014/0051548 | A1* | 2/2014 | Hino | B62M 6/55 |
| | | | | 477/15 |
| 2015/0367907 | A1* | 12/2015 | Bland | B62M 7/02 |
| | | | | 180/216 |

\* cited by examiner

MOPED

FIELD OF THE INVENTION

The present invention is in the field of moped vehicles.

DISCUSSION OF RELATED ART

Mopeds are motorized and pedal power vehicles. A variety of different moped designs have been produced for motorized transport. For example, U.S. Pat. No. 7,753,157 issued Jul. 13, 2010 to Woods entitled Motorcycle With Pedals provides a unique adjustable length crank spindle for motorcycle propulsion, the disclosure of which is incorporated herein by reference. Woods describes a moped with an engine and pedal that power an intermediate sprocket coaxially mounted with a pivoting frame joint for absorbing road vibrations.

SUMMARY OF THE INVENTION

A moped has a frame with a steering socket connected to a front end. The front end has a front wheel. The front end steers the moped. An engine is mounted to the frame. The engine drives an engine transmission having an engine sprocket axle. The engine sprocket axle drives the engine sprocket. The engine sprocket drives the engine sprocket chain.

A foot pedal is mounted on a foot pedal crank arm. The foot pedal crank arm is mounted to a foot pedal axle. The foot pedal axle is mounted to a foot pedal sprocket so that the foot pedal crank arm, the foot pedal axle and the foot pedal sprocket rotate together to drive a pedal chain. The engine is mounted at a height above the foot pedal sprocket. The engine sprocket axle drives the engine sprocket. The engine sprocket drives the engine sprocket chain. A rear wheel is mounted to a rear wheel axle. The rear wheel axle is mounted to the frame. The rear wheel on the rear wheel axle is driven by and mechanically connected to both a rear motor sprocket and a rear bicycle sprocket. The rear motor sprocket is mounted to a rear motor sprocket one way bearing, and the rear bicycle sprocket is mounted to a rear bicycle sprocket bearing. The engine sprocket chain engages and drives the rear motor sprocket. The pedal chain engages and drives the rear bicycle sprocket. A seat is also pivotally mounted to the frame.

The foot pedal axle is supplemented by a second foot pedal axle. The primary foot pedal axle is below a height of the secondary foot pedal axle. The foot pedal can be secured to the primary foot pedal axle, and the secondary foot pedal axle can also receive a secondary foot pedal. A second foot pedal axle is formed on the transmission of the engine. The second foot pedal axle is configured to drive the engine sprocket chain through an at least one intermediate linking gear. The foot pedal axle drives the linking gear. There is at least one linking gear that in turn drives the engine sprocket axle.

The engine sprocket chain and the pedal chain are mounted on the same side of the rear wheel. The rear motor sprocket and the rear bicycle sprocket share an axis of rotation on the rear wheel axle. The rear motor sprocket is mounted on the rear wheel axle between the rear bicycle sprocket and the rear wheel. The rear wheel axle is mounted on a flat plate portion of the frame, and an axle retainer adjusts a position of rear wheel axle relative to a bent portion of the flat plate potion of the frame. The second foot pedal axle has an engine pedal crank cover that covers a left end of the second foot pedal axle. The engine sprocket chain operates above the chain stay and the pedal chain runs above then under the chain stay. A side of the engine is mounted on a forward facing portion of the frame arc shaped down tube. The pedal chain tensioner flange bracket is welded and protruding down from the chain stay. The elongated exhaust is on an opposite side of the pedal chain. A large gap is formed between the front end and the engine. The gap is preferably more than 6 inches.

The following call out list of elements can be a useful guide for referencing elements of the drawings.

10 Moped
20 Engine
21 Engine Sprocket Axle
22 Engine Sprocket
23 Engine Sprocket Chain
24 Engine Mount
25 Secondary Foot Pedal Axle
26 Linking Gear
27 Engine Pedal Crank Cover
28 Transmission Housing
29 Transmission
30 Rear Wheel
31 Rear Axle
32 Rear Motor Sprocket
33 Rear Bicycle Sprocket
34 Rear Wheel Spoke
35 Rear Tire
36 Rear Motor Sprocket One Way Bearing
37 Rear Bicycle Sprocket One Way Bearing
40 Foot Pedal
41 Foot Pedal Axle
42 Foot Pedal Sprocket
43 Foot Pedal Chain
44 First Foot Pedal Crank Arm
45 Pedal Chain Tensioner Flange Bracket
50 Frame
51 Tension Arm
52 Motor Sprocket Chain Tensioner
53 Frame Down Tube
54 Chain Stay
55 Flat Plate
56 Flat Plate Bent Portion
57 Rear Axle Retainer
60 Elongated Exhaust
61 Front End
62 Steering Socket
63 Front Wheel
64 Seat
65 Seat Pivot
66 Seat Spring
67 Fuel System

DETAILED DESCRIPTION OF THE PREFERRED EMBODIMENT

The present invention is a moped 10 that generally has a foot pedal power source and a motor power source. The engine 20 receives fuel from a fuel system 67 which has a fuel tank and filter. The present invention has an engine 20 that drives an engine sprocket axle 21. The engine sprocket axle rotates the engine sprocket 22 which drives the engine sprocket chain 23. The engine 20 is mounted to the frame 50 at an engine mount 24. The motor mount 24 attaches the engine 20 to the frame 50. The frame 50 has a frame down tube 53 connected to a chain stay 54 formed as a fork. The frame also has a steering socket 62 for receiving a front end 61 having a front wheel 63. A seat 64 is also mounted to the frame 50. Therefore, the present invention has a variety of different features that are similar to mopeds currently sold in the market. The present invention also has a variety of features that are not typically found on mopeds currently sold in the market.

Figure 1:
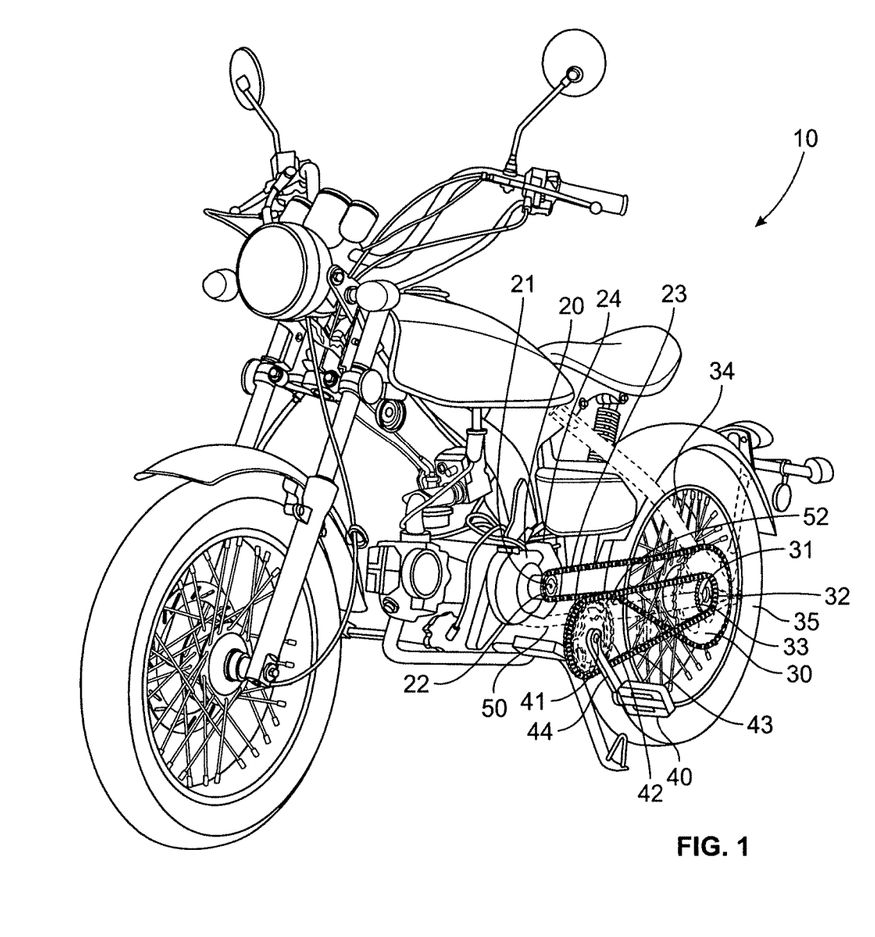
FIG. 1 is a perspective view of the present invention.
Figure 2:
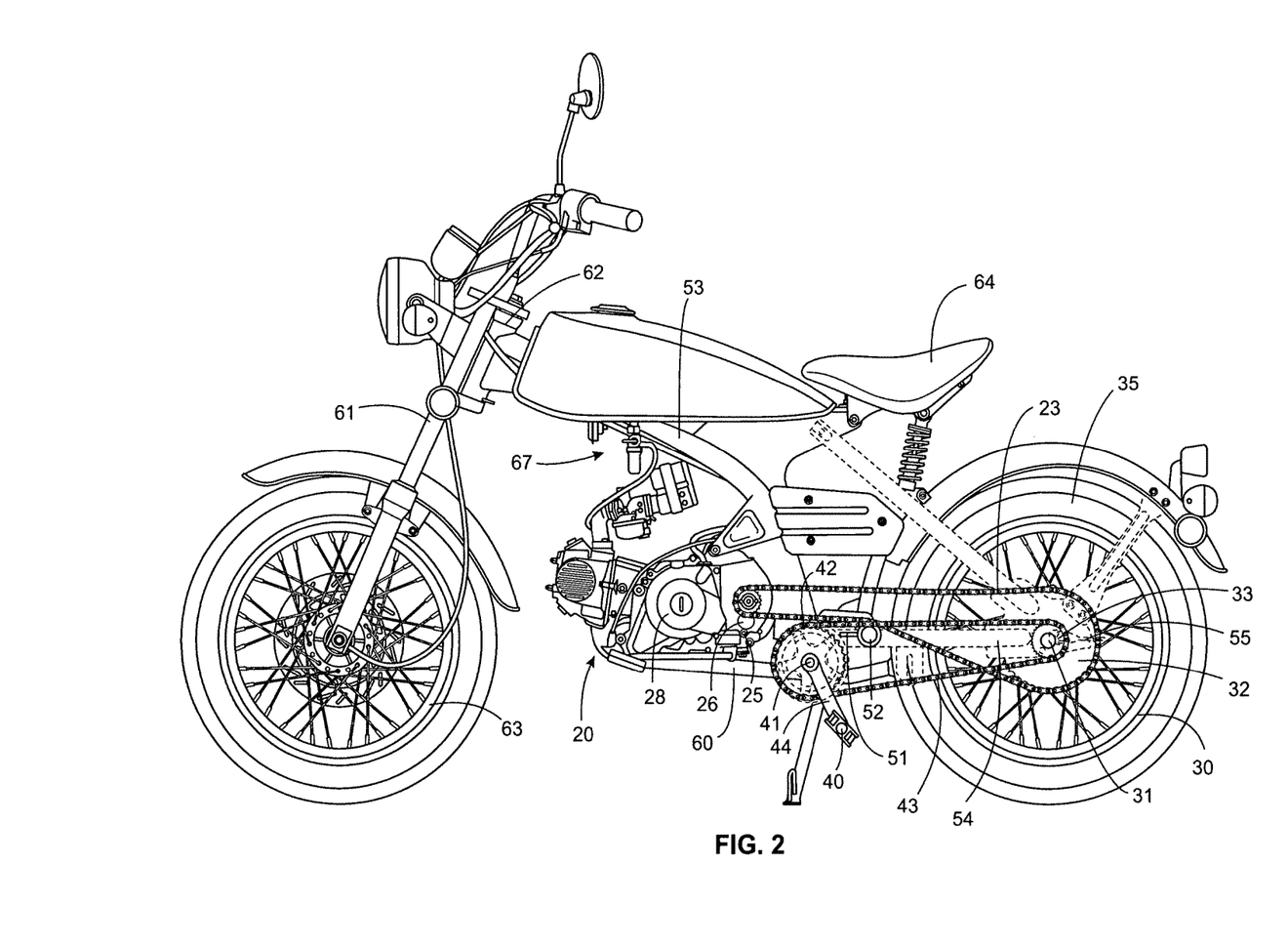
FIG. 2 is a left side view of the present invention, with the rear portion of the frame, including the chain stay portion of the frame and the flat plate portion of the frame drawn in dotted line for clarity.
Figure 3:
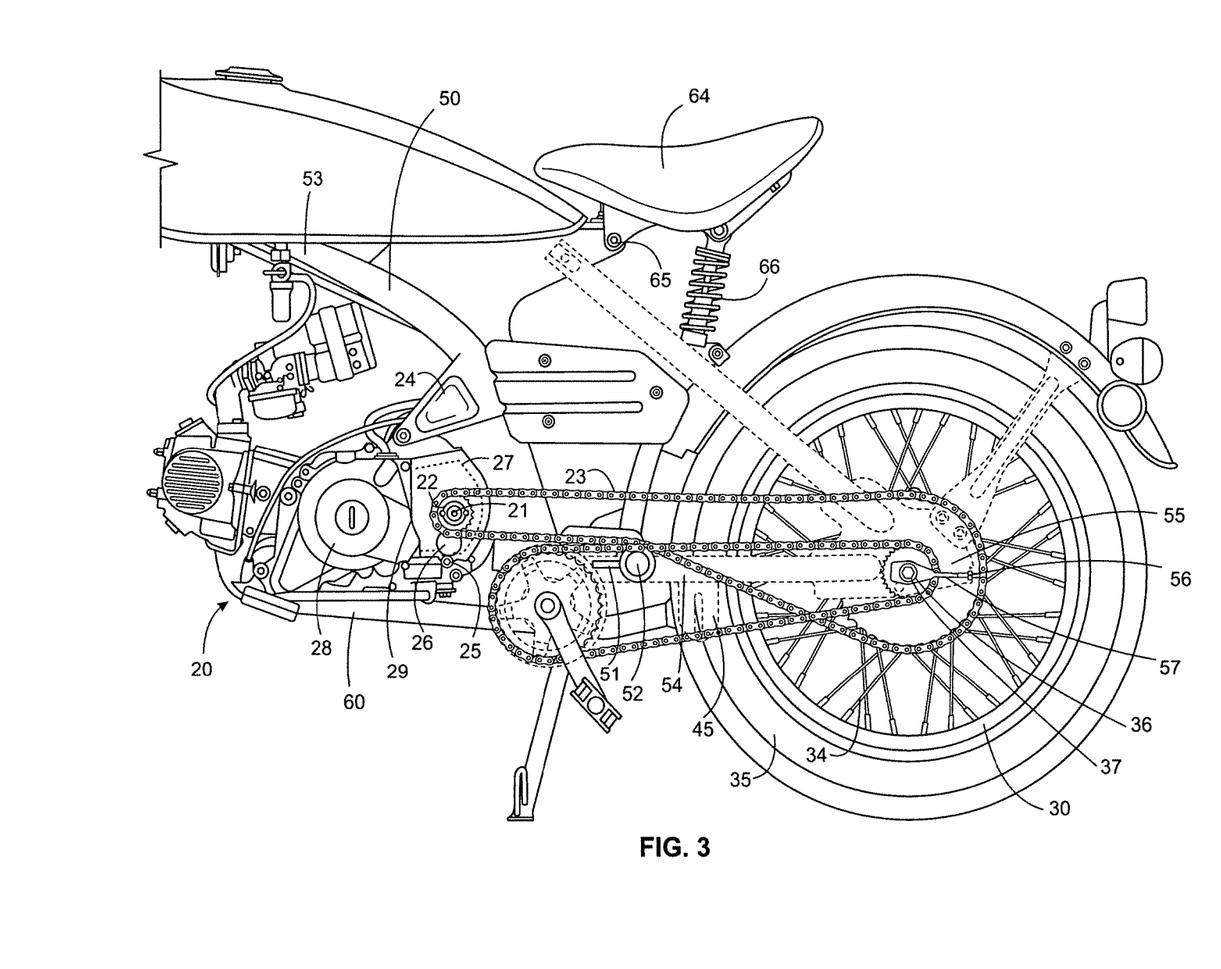
FIG. 3 is close up side view diagram of the present invention showing the chain drive mechanism configuration.
Figure 4:
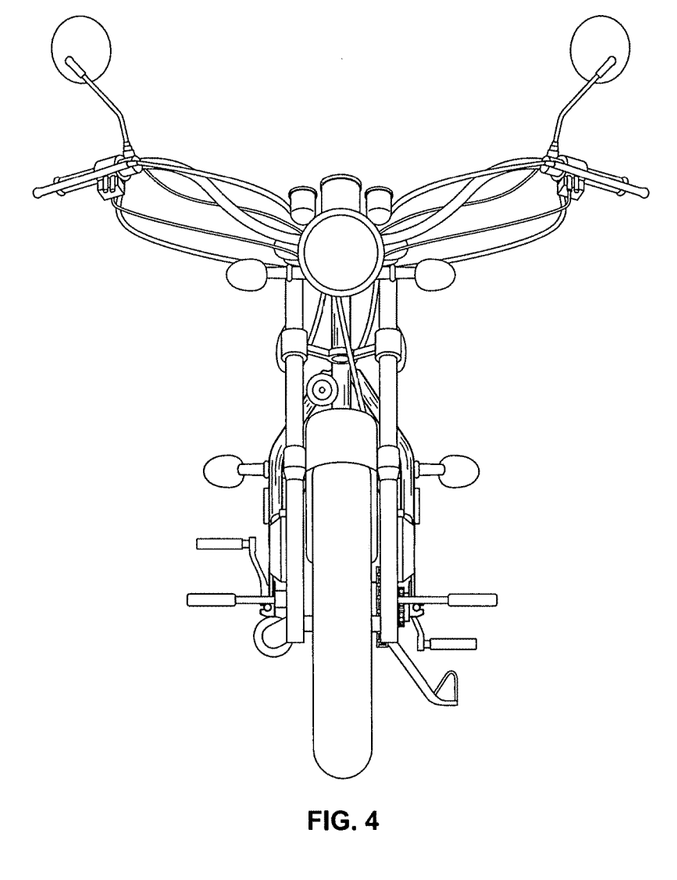
FIG. 4 is a front view of the present invention.
Figure 5:
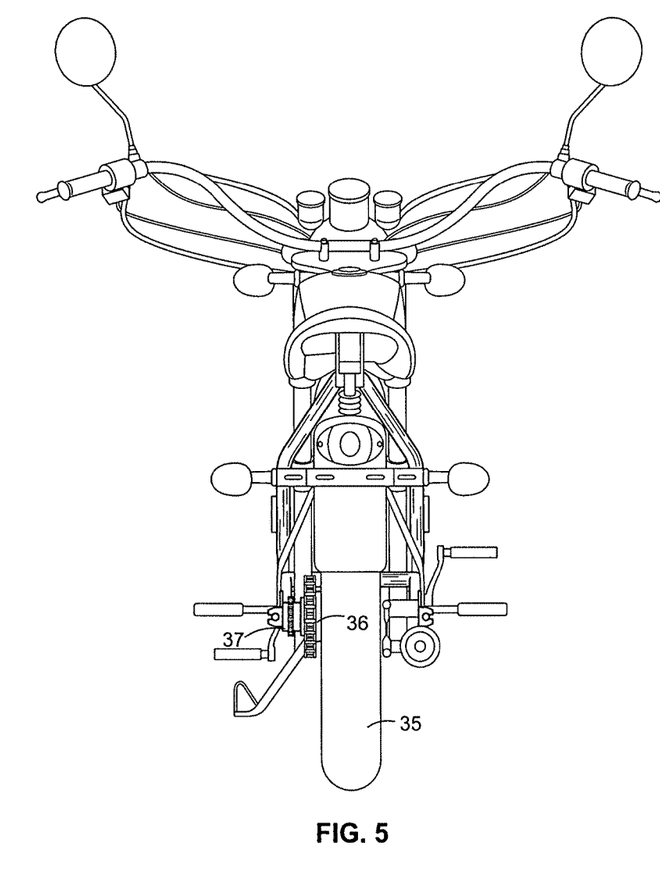
FIG. 5 is a rear view of the present invention.
Figure 6:
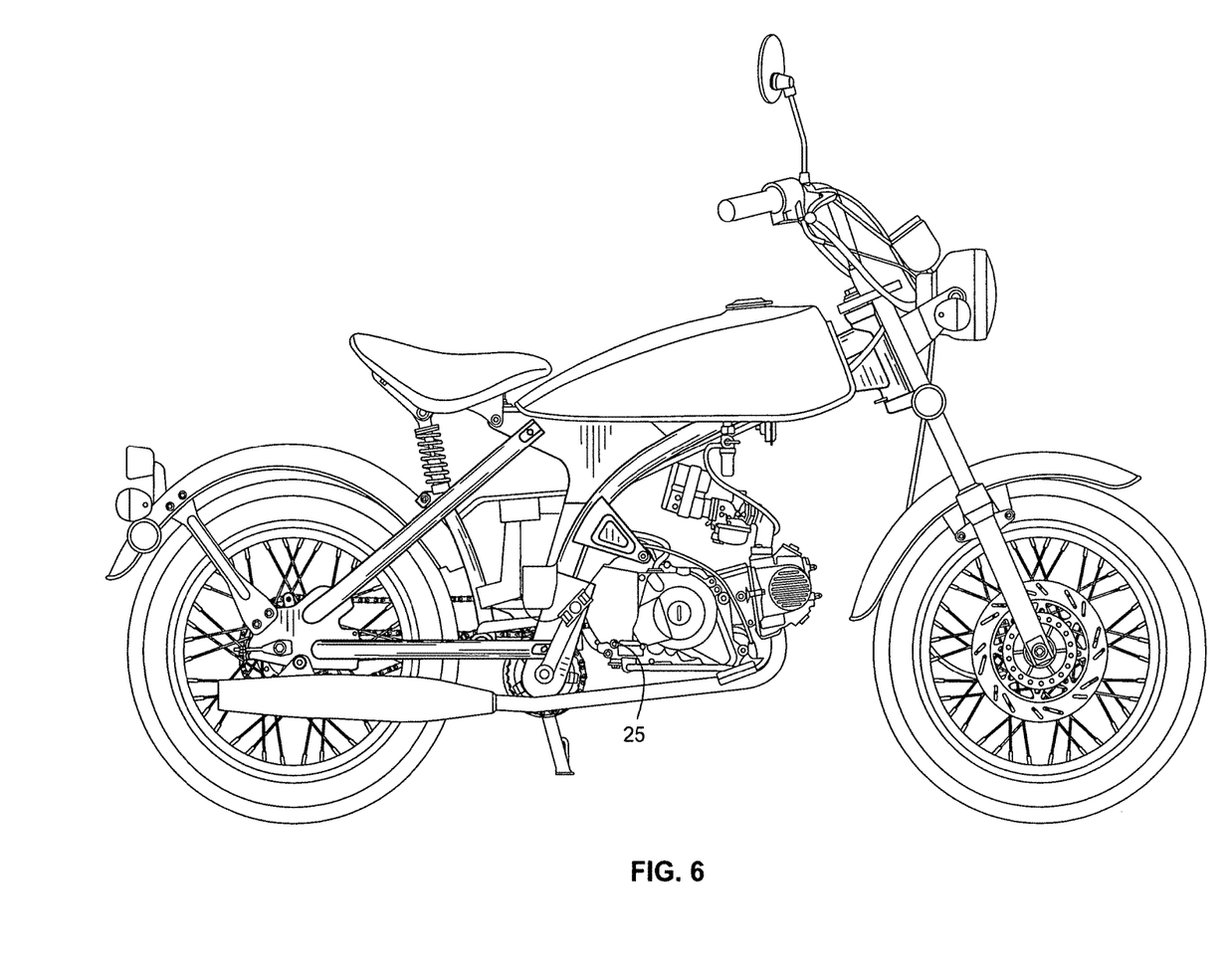
FIG. 6 is a right side view of the present invention showing the elongated exhaust.
Figure 7:
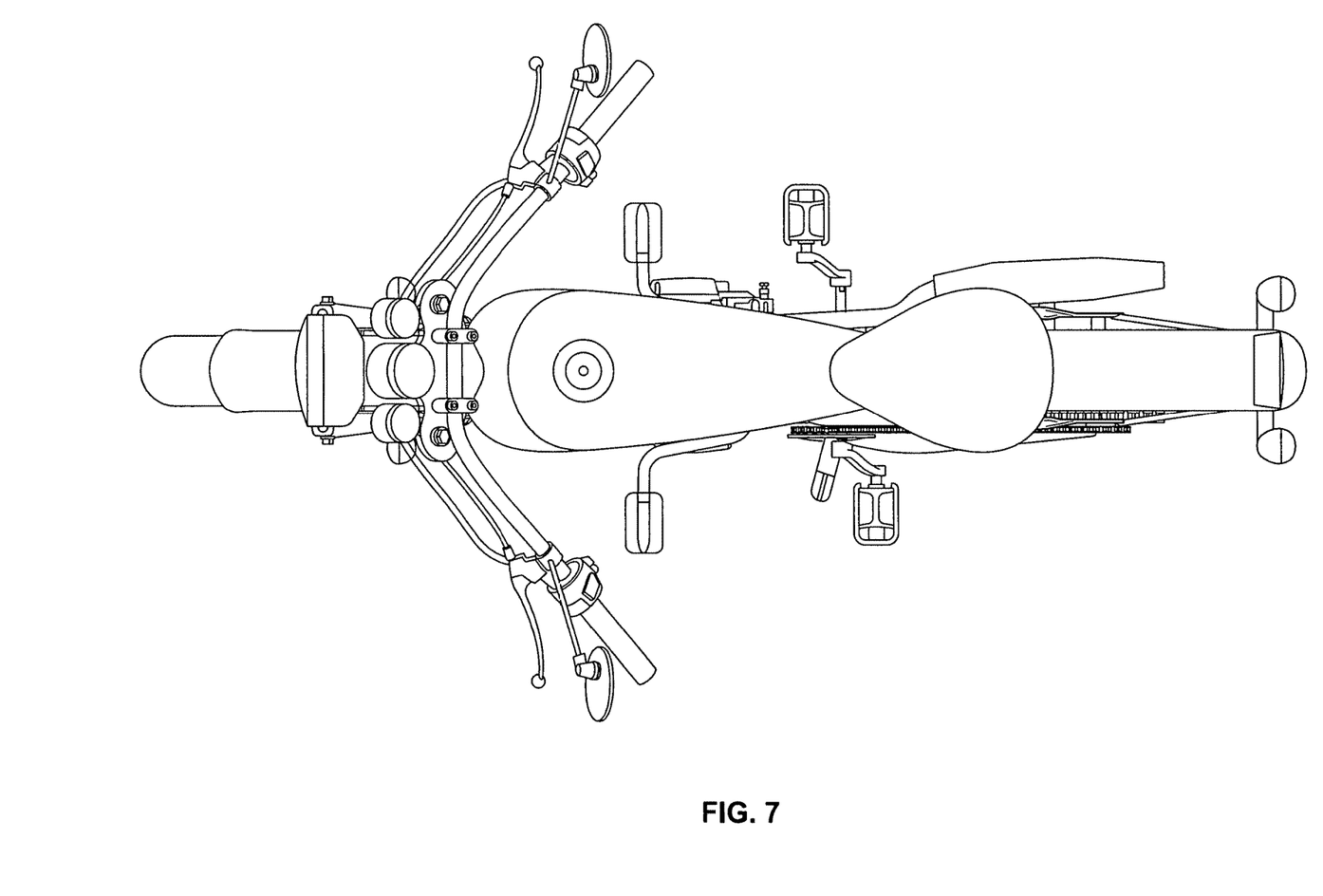
FIG. 7 is a top view of the present invention.
Figure 8:
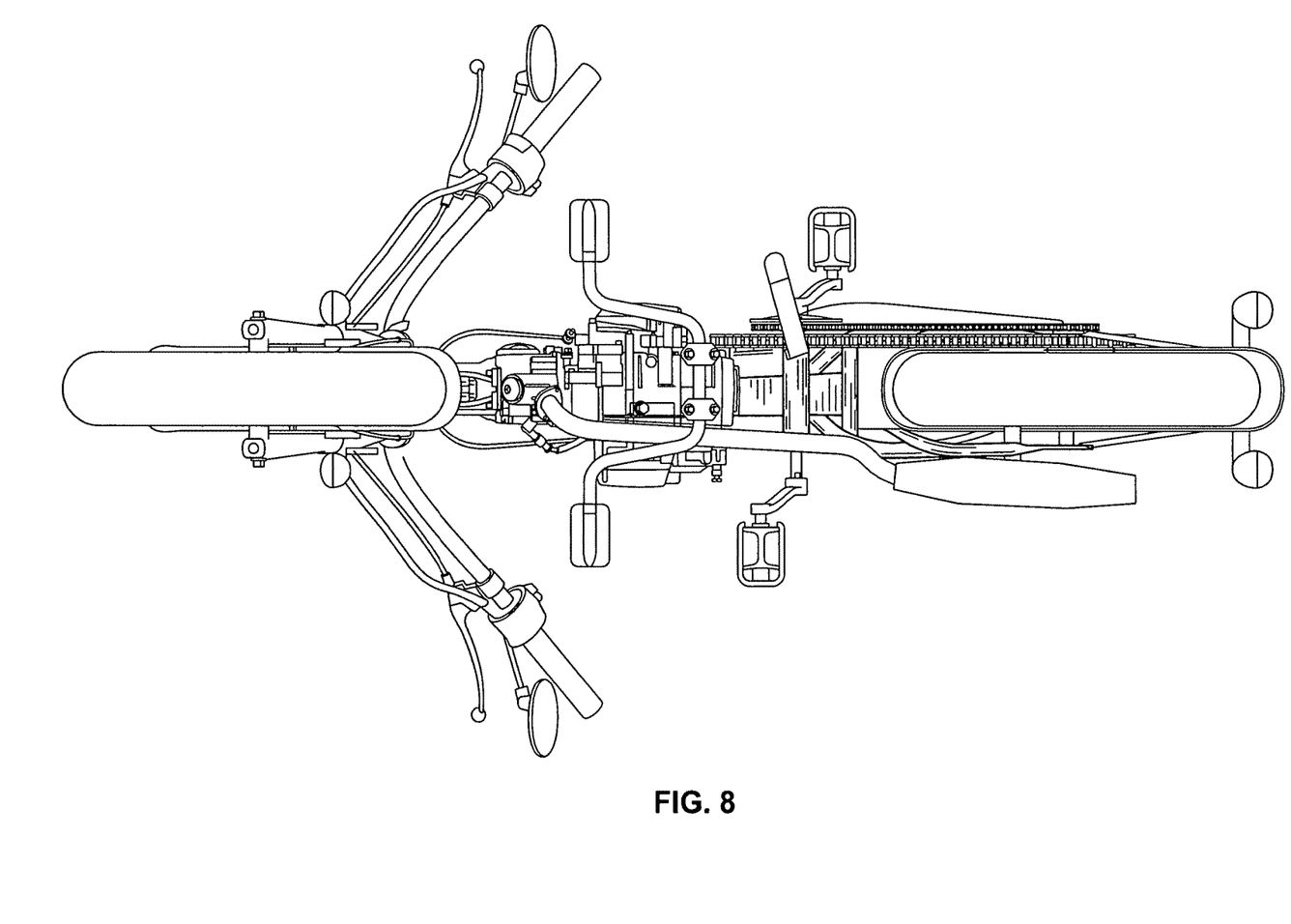
FIG. 8 is a bottom view of the present invention.

The engine 20 has a transmission 29 that includes a secondary foot pedal axle 25. The foot pedal can be relocated to a higher position by mounting it to the secondary foot pedal axle 25. The secondary foot pedal axle 25 can be covered by the engine pedal crank cover 27. The engine pedal crank cover 27 is mounted over the transmission of the engine 20 on the chain side of the moped which is the drivers left side. The engine pedal crank cover 27 covers the left side of the secondary foot pedal axle 25. The engine pedal crank cover 27 is shown as a dashed line in FIG. 3 to suggest transparency which allows the view to show the underlying linking gear 26. The user can remove the engine pedal crank over 27 and attach a foot pedal to the secondary foot pedal axle 25. Thus, the motor also has a secondary foot pedal axle 25 allowing the assembly of the foot pedal 40 to be mounted optionally on the transmission of the engine 20. The secondary foot pedal axle 25 is mechanically connected to at least one linking gear 26 within the transmission housing 28 of the transmission 29.

The foot pedal 40 is mounted on a foot pedal crank arm 44 which is in turn mounted to the foot pedal axle 41. The foot pedal axle 41 is secured to the foot pedal sprocket 42. The foot pedal sprocket drives the foot pedal chain 43. The foot pedal axle 41 is part of the pedal crank and is mounted under the frame arc shaped down tube 53. The pedal chain 43 has a tension that is adjustable with a pedal chain tensioner mounted on a pedal chain tensioner flange bracket 45. A pedal chain 43 can be tensioned if a pedal chain tensioner is mounted to the pedal chain tensioner flange bracket 45. The pedal chain tensioner can be formed as a wheel or sprocket for lifting a lower run of the foot pedal chain 43. The pedal chain tensioner flange bracket 45 is welded to extend downward from the chain stay 54.

The engine pedal crank is the secondary foot pedal axle 25 and is mounted higher than the primary foot pedal axle 41. The engine pedal crank is mounted with the engine sprocket chain 23 above the chain stay 54. The foot pedal chain 43 is the primary crank chain that runs above and below the chain stay. The chain stay is formed as a fork that receives the rear wheel between the tines of the fork. As the moped moves forward, the pedal chain moves over a top of the pedal sprocket, then along a bottom run of the pedal chain and then around the rear wheel bicycle sprocket, and then along the top run of the pedal chain.

The engine 20 is easily replaceable as the engine 20 has a large gap of at least 6-8 inches between the front end of the moped and the engine 20. The engine is forward mounted on the frame arc shaped down tube 53. The engine sprocket chain 23 has an upper run and a lower run.

The lower run of the engine sprocket chain 23 engages a engine sprocket chain tensioner 52 that biases the lower run of the engine sprocket chain 23 upward. A tension arm 51 mounted between the frame 50 and the motor sprocket chain tensioner 52 biases the lower run of the engine sprocket chain 23 upward. The motor sprocket chain tensioner 52 can be formed as a high density polyethylene wheel bearing to minimize friction.

By mounting the foot pedal chain 43 independently of the engine sprocket chain 23, the elongated exhaust can be mounted on the opposite side of the foot pedal chain 43 and mounted on the opposite side of the engine sprocket chain 23, which would be on the driver's right side as shown in the figures. The elongated exhaust 60 receives exhaust from the engine 20 and exhausts the exhaust gases behind the rear axle 31. The elongated exhaust 60 is mounted opposite the chain side on the exhaust side of the moped.

The rear axle 31 is adjustable in a horizontal direction and mounted on a flat plate 55 of the frame 50. The flat plate of the frame 50 provides a mounting surface for a rear axle retainer 57. The rear axle retainer 57 is preferably formed as a bolt tied to a flat plate bent portion 56 at a bolt rear end. The bolt has a front end that has a loop or opening for retaining the rear axle 31. The flat plate bent portion is located immediately behind the rear axle 31 and has an adjustment nut for fine-tuned positioning of the rear axle 31 in the horizontal direction. The flat plate bent portion 56 can be welded to the frame down tube 53 to form a rigid frame 50.

The rear wheel 30 has a rear wheel tire 35 and is supported by a number of rear wheel spokes 34. The rear wheel 30 is rotably mounted on a rear wheel axle 31. The rear wheel axle 31 is mounted to a rear portion of the frame 50. The rear wheel on the rear wheel axle 31 is driven by both a rear motor sprocket 32 and a rear bicycle sprocket 33. The rear motor sprocket 32 and the rear bicycle sprocket 33 are both mounted coaxially on one-way bearings for independently and selectively driving the rear wheel on the rear wheel axle 31. The rear wheel spokes 34 supports the rear wheel. The rear motor sprocket 32 has a larger diameter and has more teeth than the rear bicycle sprocket 33. In contrast, the engine sprocket 22 has a smaller diameter and has less teeth than the foot pedal sprocket 42.

The rear motor sprocket 32 is mounted to a rear motor sprocket one way bearing 36. The rear bicycle sprocket 33 is mounted to a rear bicycle sprocket one way bearing 37. Both one way bearings rotate the rear wheel in a forward direction. The rear motor sprocket one way bearing 36 of the rear motor sprocket 32 is mounted adjacent to the wheel. The rear bicycle sprocket one way bearing 37 of the rear bicycle sprocket 32 is mounted adjacent to the rear motor sprocket one way bearing 36 of the rear motor sprocket 32. Thus, the rear bicycle sprocket one way bearing 37 is to the left of and mounted to the outside direction of the rear motor sprocket 32. In other words, the rear motor sprocket one way bearing 36 is mounted on the inside while the rear bicycle sprocket one way bearing 37 is mounted on the outside. Thus, the rear motor sprocket 32 is mounted on the rear wheel axle 31 between the rear bicycle sprocket and the rear wheel.

The frame is secured to the engine 20 and the frame is secured to the socket of the primary foot pedal axle such as that the distance between the primary foot pedal axle 41 to the second foot pedal axle 25 does not change during use. The frame is secured to the engine at a forwardly facing bracket. The forwardly facing bracket is preferably welded to the downtube so that it extends forward from the downtube.

The seat 64 is pivotally connected to the frame 50 at a pair of seat pivots 65. The seat 64 is biased upward with a seat spring 66. The seat spring 66 has an upper portion pivotally mounted to the lower portion of the seat 64 and the seat spring 66 has a lower portion pivotally mounted to the frame 50. The seat spring 66 can be adjusted in tension for different user weight. The seat spring 66 can also have a shock dampener to dissipate bounce. The seat pivot 65 is mounted to a forward portion of the seat 64 and the seat spring 66 is mounted to a rear portion of the seat 64. When the user hits a bump, the seat can pivot for relieving transmission of road vibration to the user. The seat has a rearward pivoting motion.

The above described specification teaches a particular embodiment of the invention. The invention is defined in the claims.

The invention claimed is:

1. A moped comprising:
  a frame with a steering socket connected to a front end, wherein the front end has a front wheel, wherein the front end steers the moped;
  an engine mounted to the frame, wherein the engine drives an engine transmission having an engine sprocket axle, wherein an engine sprocket axle drives an engine sprocket, wherein the engine sprocket drives an engine sprocket chain;
  a foot pedal mounted on a foot pedal crank arm, wherein the foot pedal crank arm is mounted to a primary foot pedal axle, wherein the primary foot pedal axle is mounted to a foot pedal sprocket so that the foot pedal crank arm, the primary foot pedal axle and the foot pedal sprocket rotate together to drive a pedal chain, wherein the engine is mounted at a height above the foot pedal sprocket, wherein the engine sprocket axle drives the engine sprocket, wherein the engine sprocket drives the engine sprocket chain;
  a rear wheel mounted to a rear wheel axle, wherein the rear wheel axle is mounted to the frame, wherein the rear wheel on the rear wheel axle is driven by and mechanically connected to both a rear motor sprocket and a rear bicycle sprocket, wherein the rear motor sprocket is mounted to a rear motor sprocket one way bearing, and wherein the rear bicycle sprocket is mounted to a rear bicycle sprocket bearing, wherein the engine sprocket chain engages and drives the rear motor sprocket, wherein the pedal chain engages and drives the rear bicycle sprocket;
  a seat mounted to the frame; and
  a second foot pedal axle formed on the transmission of the engine, wherein the second foot pedal axle is configured to drive the engine sprocket chain through an at least one intermediate linking gear, wherein the primary foot pedal axle drives the linking gear, wherein the at least one intermediate linking gear in turn drives the engine sprocket axle.

2. The moped of claim 1, wherein the engine sprocket chain and the pedal chain are mounted on the same side of the rear wheel, wherein the rear motor sprocket and the rear bicycle sprocket share an axis of rotation on the rear wheel axle, wherein the rear motor sprocket is mounted on the rear wheel axle between the rear bicycle sprocket and the rear wheel.

3. The moped of claim 1, wherein the rear wheel axle is mounted on a flat plate portion of the frame, wherein an axle retainer adjusts a position of rear wheel axle relative to a bent portion of the flat plate portion of the frame.

4. The moped of claim 1, wherein the second foot pedal axle has an engine pedal crank cover that covers a left end of the second foot pedal axle.

5. A moped comprising:
  a frame with a steering socket connected to a front end, wherein the front end has a front wheel, wherein the front end steers the moped;
  an engine mounted to the frame, wherein the engine drives an engine transmission having an engine sprocket axle, wherein an engine sprocket axle drives an engine sprocket, wherein the engine sprocket drives an engine sprocket chain;
  a foot pedal mounted on a foot pedal crank arm, wherein the foot pedal crank arm is mounted to a primary foot pedal axle, wherein the primary foot pedal axle is mounted to a foot pedal sprocket so that the foot pedal crank arm, the primary foot pedal axle and the foot pedal sprocket rotate together to drive a pedal chain, wherein the engine is mounted at a height above the foot pedal sprocket, wherein the engine sprocket axle drives the engine sprocket, wherein the engine sprocket drives the engine sprocket chain;
  a rear wheel mounted to a rear wheel axle, wherein the rear wheel axle is mounted to the frame, wherein the rear wheel on the rear wheel axle is driven by and mechanically connected to both a rear motor sprocket and a rear bicycle sprocket, wherein the rear motor sprocket is mounted to a rear motor sprocket one way bearing, and wherein the rear bicycle sprocket is mounted to a rear bicycle sprocket bearing, wherein the engine sprocket chain engages and drives the rear motor sprocket, wherein the pedal chain engages and drives the rear bicycle sprocket;
  a seat mounted to the frame, wherein the engine sprocket chain operates above a chain stay and wherein the pedal chain runs above then under the chain stay, wherein a side of the engine is mounted on a forward facing portion of a frame arc shaped down tube; and
  wherein a pedal chain tensioner flange bracket is welded and protruding down from the chain stay.

6. The moped of claim 5, wherein an elongated exhaust is on an opposite side of the pedal chain.

7. The moped of claim 6, wherein a gap is formed between the front end and the engine, wherein the gap is more than 6 inches.

8. The moped of claim 6, wherein the primary foot pedal axle is supplemented by a second foot pedal axle, wherein the primary foot pedal axle is below a height of the secondary foot pedal axle, wherein the foot pedal can be secured to the primary foot pedal axle, and the secondary foot pedal axle can also receive a secondary foot pedal.

9. A moped comprising:
  a frame with a steering socket connected to a front end, wherein the front end has a front wheel, wherein the front end steers the moped;
  an engine mounted to the frame, wherein the engine drives an engine transmission having an engine sprocket axle, wherein an engine sprocket axle drives an engine sprocket, wherein the engine sprocket drives an engine sprocket chain;
  a foot pedal mounted on a foot pedal crank arm, wherein the foot pedal crank arm is mounted to a primary foot pedal axle, wherein the primary foot pedal axle is mounted to a foot pedal sprocket so that the foot pedal crank arm, the primary foot pedal axle and the foot pedal sprocket rotate together to drive a pedal chain, wherein the engine is mounted at a height above the foot pedal sprocket, wherein the engine sprocket axle drives the engine sprocket, wherein the engine sprocket drives the engine sprocket chain;

a rear wheel mounted to a rear wheel axle, wherein the rear wheel axle is mounted to the frame, wherein the rear wheel on the rear wheel axle is driven by and mechanically connected to both a rear motor sprocket and a rear bicycle sprocket, wherein the rear motor sprocket is mounted to a rear motor sprocket one way bearing, and wherein the rear bicycle sprocket is mounted to a rear bicycle sprocket bearing, wherein the engine sprocket chain engages and drives the rear motor sprocket, wherein the pedal chain engages and drives the rear bicycle sprocket;

a seat mounted to the frame; and wherein the engine sprocket chain operates above a chain stay and wherein the pedal chain runs above then under the chain stay, wherein a side of the engine is mounted on a forward facing portion of the frame arc shaped down tube, wherein an elongated exhaust is on an opposite side of the pedal chain;

further comprising: a second foot pedal axle formed on the transmission of the engine, wherein the second foot pedal axle is configured to drive the engine sprocket chain through an at least one intermediate linking gear, wherein the primary foot pedal axle drives the linking gear, wherein the at least one linking gear in turn drives the engine sprocket axle.

10. The moped of claim 9, wherein the engine sprocket chain and the pedal chain are mounted on the same side of the rear wheel, wherein the rear motor sprocket and the rear bicycle sprocket share an axis of rotation on the rear wheel axle, wherein the rear motor sprocket is mounted on the rear wheel axle between the rear bicycle sprocket and the rear wheel.

11. The moped of claim 9, wherein the rear wheel axle is mounted on a flat plate portion of the frame, wherein an axle retainer adjusts a position of rear wheel axle relative to a bent portion of the flat plate portion of the frame.

* * * * *